United States Patent [19]
Dolch

[11] 4,211,145
[45] Jul. 8, 1980

[54] BLIND RIVET

[75] Inventor: Gernot Dolch, Heidelberg, Fed. Rep. of Germany

[73] Assignee: Mecano-Simmonds GmbH, Heidelberg, Fed. Rep. of Germany

[21] Appl. No.: 609,775

[22] Filed: Sep. 2, 1975

[30] Foreign Application Priority Data

Sep. 4, 1974 [DE] Fed. Rep. of Germany ....... 2442292

[51] Int. Cl.² .............................................. F16B 13/06
[52] U.S. Cl. .............................................. 85/72; 85/77
[58] Field of Search .......................... 85/77, 78, 72, 37

[56] References Cited

U.S. PATENT DOCUMENTS

| 2,384,321 | 9/1945 | Lees | 85/78 |
| 2,538,623 | 1/1951 | Keating | 85/78 |
| 2,545,752 | 3/1951 | Singleton | 85/78 |
| 3,047,181 | 7/1962 | Heidenwolf | 85/78 X |
| 3,147,525 | 9/1964 | Texier | 85/77 X |
| 3,272,060 | 9/1966 | Morin | 85/77 |
| 3,285,121 | 11/1966 | Siebol | 85/72 |
| 3,678,535 | 7/1972 | Charles | 85/77 |

FOREIGN PATENT DOCUMENTS

| 1273265 | 7/1968 | Fed. Rep. of Germany | 85/77 |
| 602652 | 5/1948 | United Kingdom | 85/77 |
| 840563 | 7/1960 | United Kingdom | 85/77 |

*Primary Examiner*—Rodney H. Bonck
*Attorney, Agent, or Firm*—Smyth, Pavitt, Siegemund, Jones & Martella

[57] ABSTRACT

A blind rivet fabricated out of thermoplastic material and having a sealing ring spaced from the set head. The sealing ring has a diameter larger than the tubular rivet and spaced from the head to be disposed within the through-holes of the coupled parts when the rivet is set. The sealing ring insures a tight connection of the set rivet.

1 Claim, 2 Drawing Figures

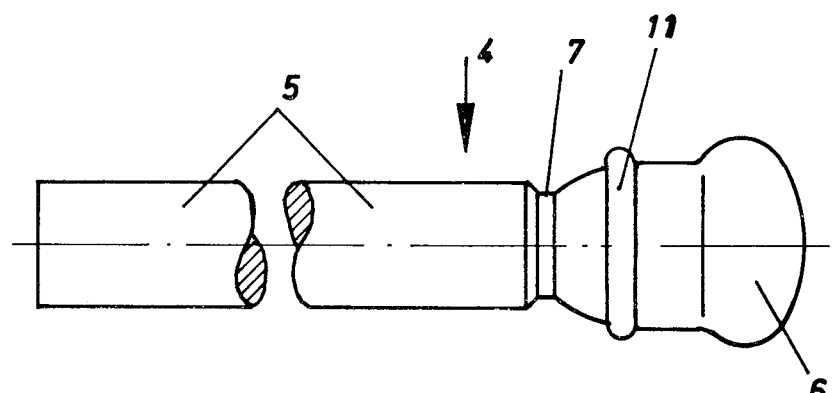
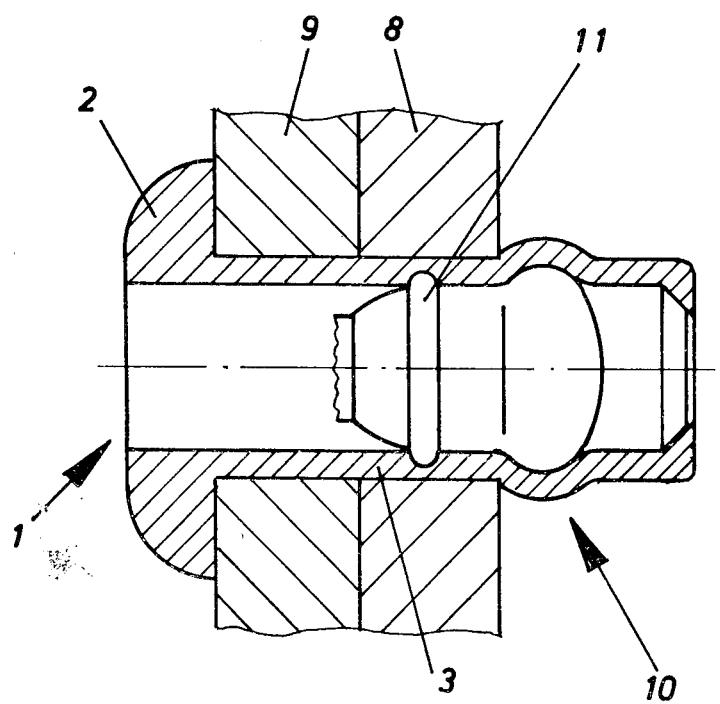

BLIND RIVET

BACKGROUND OF THE INVENTION

The invention relates to a blind rivet fabricated out of thermoplastic synthetic material and consisting of a tubular rivet with a set head and a mandrel with a thickened head which forms a snap head at the free end of the tubular rivet when the mandrel is retracted and the pull shank of the mandrel breaks away at the preset breaking point after the formation of the set head.

U.S. Pat. application Ser. No. 490,602 filed July 22, 1974 and owned by the assignee of this application, discloses a tubular rivet with a set head and a mandrel with a thickened head which forms a snap head at the free end of the tubular rivet when the set mandrel is retracted and the pull shank of the mandrel breaks away at the preset breaking point. In the case of this blind rivet the tubular rivet and the mandrel are of thermoplastic synthetic material and the tubular rivet is integrally formed to the mandrel and a breakaway point is provided between the tubular rivet and the mandrel.

When such a blind rivet is set, it is not always possible to achieve tightness of the coupling of the metal parts held together thereby. This is particularly true when the set head is not perfectly smooth or uniform in configuration.

SUMMARY OF THE INVENTION

The invention has to provide a blind rivet which guarantees absolute tightness even when the set head of the mandrel is not smooth or uniform and/or the receiving holes of the workpiece which is to be riveted are not exactly worked out.

In the case of a blind rivet of thermoplastic synthetic material consisting of a tubular rivet with a set head and a mandrel with a thickened head which forms a snap head at the free end of the tubular rivet when the mandrel is retracted and the pull shank of the mandrel breaks away at the preset breaking point after the formation of the snap head, the above-mentioned objective is solved in such a way that at the conical part of the head of the mandrel, in the zone between preset breaking point and the greatest diameter of the head, an integrated sealing ring is located, the outer diameter of which is greater than the through bore of the tubular rivet, and the distance between the greatest diameter of the head and the sealing ring is designed in such a way that the sealing ring after the setting of the blind rivet is situated inside the through hole of that part which is to be riveted.

In accordance with the invention, absolute tightness of the blind rivet is guaranteed even in the case of non-circular and rough receiving holes and also in the case of too large length of the rivet shank which is not adapted to the thickness of the workpiece which is to be riveted, as it often occurs in practice.

The invention provides a second sealing point which is situated within the through bore of the workpiece which is to be riveted. This absolute tightness is achieved by means of the bearing pressure between the integrated sealing ring and the wall of the tubular rivet with respect to the wall of the receiving hole.

Moreover, the sealing ring prevents the head of the mandrel from being displaced in axial direction. Accordingly, the blind rivet can be loaded to a far higher degree even from the side where the set head is located.

Other objects, features and advantages of the invention will appear from the disclosure hereof.

DESCRIPTION OF THE DRAWINGS

FIG. 1 is a fragmentary side elevation of the mandrel.

FIG. 2 is a fragmentary cross section of the blind rivet after its setting with respect to the workpieces.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 shows the mandrel 4 with the pull shank 5, the head 6 and the preset breaking point 7. The sealing ring 11 is located at the thickened conical part of the head 6 in the zone between the preset breaking point 7 and the greatest diameter of the head 6. Preferably, the diameter of the sealing ring 11 is smaller than the greatest diameter of the head 6, however greater than the through hole of the tubular rivet 1. Ring 11 projects beyond the outer surface of the head 6 at the intersection of its conical part and cylindrical part adjoining the bulbous end portion thereof, thus to provide a projecting edge. The mandrel 4 together with the tubular rivet forms a complete blind rivet.

For the setting of this blind rivet out of thermoplastic synthetic material, one of the known riveting tools is used. The riveting tools and the various steps of the setting procedure are not described since they are well known.

FIG. 2 shows a blind rivet which is set in the through hole of the metal sheets 8 and 9 and which rests with its set head 2 against the metal sheet 9 and with the snap head 10 against the metal sheet 8. In the case of the set blind rivet, absolute tightness is acheived by means of the bearing pressure between the integrated sealing ring 11 and the sleeve part 3 of the tubular rivet, with respect to the walls of the through holes of the metal sheets 8 and 9. This provides a second sealing point in case of, for example, non-circular or rough receiving holes or in case the heads of the mandrels are non-uniform or rough because of damage done by inexact closing of the tool chucks in the injection molding tool.

What is claimed is:

1. A blind rivet for coupling two work pieces having aligned through-holes, being comprised of a tubular rivet with a through-hole and a set head and a mandrel having a pull shank, a thickened head which forms a snap head at the free end of the tubular rivet when the mandrel is retracted, and the pull shank of the mandrel breaks away at the preset breaking point after the formation of the snap head, one of said work pieces being adjacent the rivet set head and the other said work piece being adjacent said thickened head, the improvement comprising:

said rivet being fabricated out of thermoplastic synthetic material and said mandrel having a conical part spaced from said thickened head, and a cylindrical part between said thickened head and said conical part, said conical part tapering down to a break joint with said pull shank, an integral sealing ring at the juncture of the said conical part and said cylindrical part and located between said break joint and the greatest diameter of the head, the outer diameter of said ring being greater than said conical part and said cylindrical part so that the ring projects radially all along its circumference from the conical part and the cylindrical part, the diameter of the ring being also larger than the through-hole of the tubular rivet, and the distance between the greatest diameter of the head and the sealing ring is chosen so that the sealing ring is disposed inside the through-hole of said other work piece when the rivet is set, said break joint being inside the through-hole of the rivet when it is broken whereby to have no part of the draw shank extending from the rivet after the rivet is set and the draw shank broken off.

* * * * *